United States Patent
Chen et al.

(10) Patent No.: US 10,888,158 B1
(45) Date of Patent: Jan. 12, 2021

(54) SLIDE RAIL ASSEMBLY

(71) Applicants: KING SLIDE WORKS CO., LTD., Kaohsiung (TW); KING SLIDE TECHNOLOGY CO.,LTD., Kaohsiung (TW)

(72) Inventors: Ken-Ching Chen, Kaohsiung (TW); Shun-Ho Yang, Kaohsiung (TW); Wei-Chen Chang, Kaohsiung (TW); Chun-Chiang Wang, Kaohsiung (TW)

(73) Assignees: KING SLIDE WORKS CO., LTD., Kaohsiung (TW); KING SLIDE TECHNOLOGY CO., LTD., Kaohsiung (TW)

( * ) Notice: Subject to any disclaimer, the term of this patent is extended or adjusted under 35 U.S.C. 154(b) by 0 days.

(21) Appl. No.: 16/705,249

(22) Filed: Dec. 6, 2019

(30) Foreign Application Priority Data

Sep. 26, 2019  (TW) .............................. 108135653 A

(51) Int. Cl.
| | |
|---|---|
| *F16C 29/04* | (2006.01) |
| *A47B 88/493* | (2017.01) |
| *A47B 88/487* | (2017.01) |
| *A47B 88/473* | (2017.01) |
| *A47B 88/45* | (2017.01) |

(52) U.S. Cl.
CPC ............ *A47B 88/493* (2017.01); *A47B 88/45* (2017.01); *A47B 88/473* (2017.01); *A47B 88/487* (2017.01); *F16C 29/04* (2013.01)

(58) Field of Classification Search
CPC ...... F16C 29/04; F16C 29/045; F16C 29/046; F16C 2314/72; A47B 88/45; A47B 88/473; A47B 88/493; A47B 2210/0032; A47B 2210/0035; A47B 2210/0067; A47B 2210/007
See application file for complete search history.

(56) References Cited

U.S. PATENT DOCUMENTS

| | | | | |
|---|---|---|---|---|
| 6,749,276 | B2 * | 6/2004 | Judge | A47B 88/493 312/334.11 |
| 6,945,619 | B1 * | 9/2005 | Chen | A47B 88/487 312/334.47 |
| 8,303,183 | B2 | 11/2012 | Chen | |
| 10,244,868 | B2 | 4/2019 | Chen | |
| 10,463,150 | B2 | 11/2019 | Chen | |
| 2008/0303395 | A1 | 12/2008 | Chen | |
| 2016/0128472 | A1 * | 5/2016 | Ng | A47B 88/493 384/18 |
| 2016/0316911 | A1 | 11/2016 | Berchtold | |
| 2019/0200756 | A1 * | 7/2019 | Chen | A47B 88/40 |
| 2019/0200759 | A1 * | 7/2019 | Chen | H05K 7/1489 |

FOREIGN PATENT DOCUMENTS

| | | | | |
|---|---|---|---|---|
| GB | 2 122 274 | A | 1/1984 | |
| JP | 3160280 | U * | 6/2010 | ........... A47B 88/493 |
| WO | 2015/061814 | A1 | 5/2015 | |

\* cited by examiner

*Primary Examiner* — Phillip A Johnson
(74) *Attorney, Agent, or Firm* — Winston Hsu

(57) ABSTRACT

A slide rail assembly includes a first rail, a second rail, a first slide-aiding device and a second slide-aiding device. The second rail is displaceable relative to the first rail. The first slide-aiding device and the second slide-aiding device are arranged at the first rail. When the second rail is located at a retracted position relative to the first rail, the first slide-aiding device and the second slide-aiding device are configured to support the second rail.

20 Claims, 15 Drawing Sheets

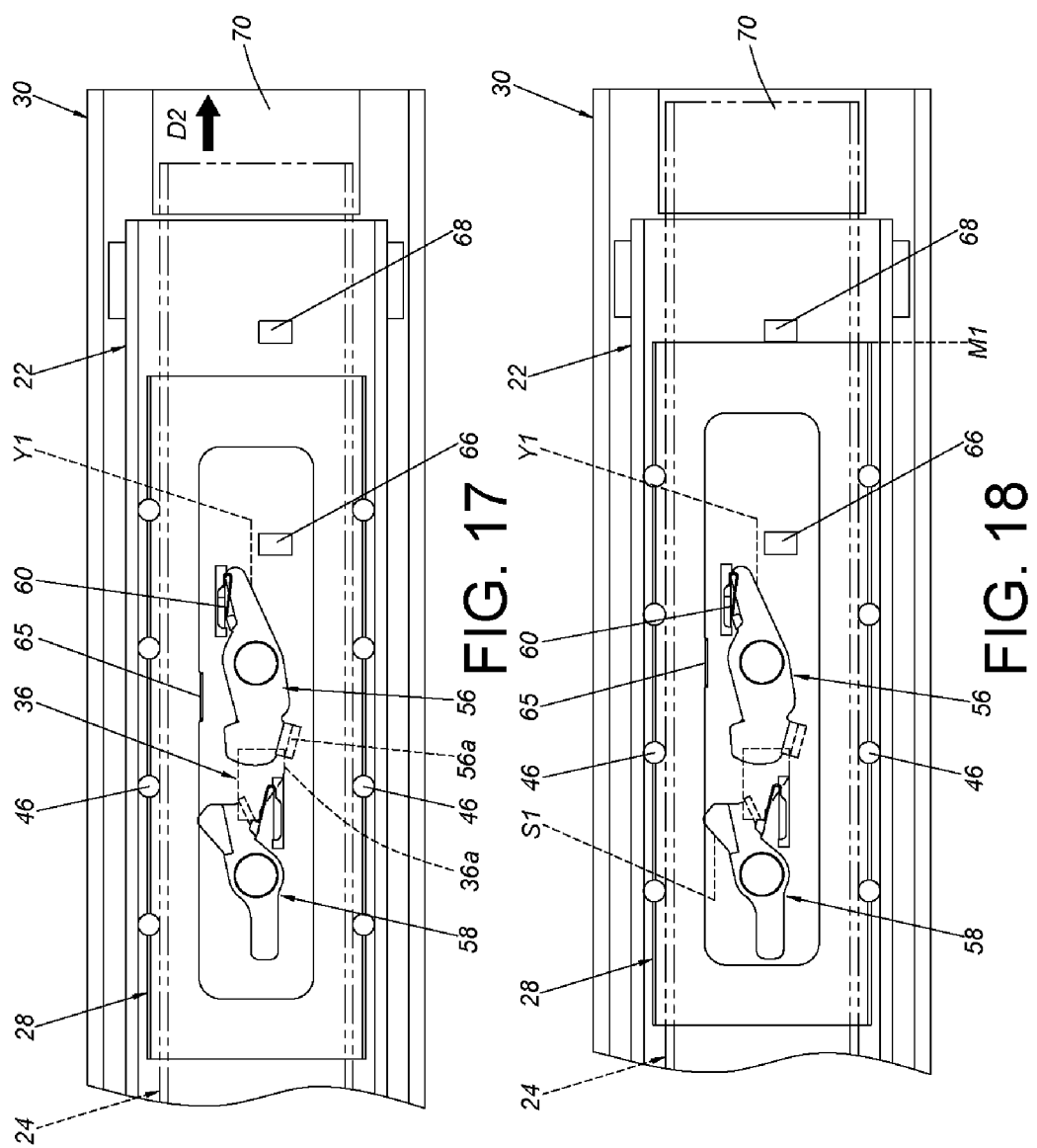

SLIDE RAIL ASSEMBLY

BACKGROUND OF THE INVENTION

1. Field of the Invention

The present invention relates to a slide rail assembly and structure, and more particularly, to a slide rail assembly comprising at least two slide-aiding devices between two slide rails.

2. Description of the Prior Art

As shown in FIG. 1, a slide rail assembly 100 of a prior art comprises a plurality of slide rails that can displace or move relative to each other, such as an outer rail 102, a middle rail 104, and an inner rail 106. The slide rails 102, 104, 106 are typically arranged with slide-aiding devices; for example, a slide-aiding device 108 is arranged between the middle rail 104 and the inner rail 106, and the slide-aiding device 108 typically comprises a plurality of balls capable of supporting the middle rail 104 and the inner rail 106 while assisting in the relative displacement of the two rails. When the slide rail assembly 100 of the prior art is at a retracted status in which the inner rail 106 is retracted relative to the middle rail 104, the slide-aiding device 108 typically only supports approximately a middle section of the inner rail 106. Therefore, a rear section K of the inner rail 106 is not supported by the slide-aiding device 108 (or the plurality of balls), thereby causing the rear section K of the inner rail 106 to be susceptible to deformation or bending due to external forces or the weight of a carried object.

U.S. Pat. No. 8,303,183 B2 of Chen et al. incorporates a design involving an additional ball bearing on an end of an inner rail to overcome the above-mentioned drawback. However, such ball bearing would synchronously displace with the inner rail during usage while taking up space in a passage on the end of the inner rail. Such arrangement is disadvantageous towards designing additional interactive mechanisms/structures (such as a synchronizing mechanism/structure or a positioning mechanism/structure) for the assembly, thereby affecting the functionality of the slide rails.

SUMMARY OF THE INVENTION

The present invention relates to a slide rail assembly having two slide-aiding devices arranged between two slide rails.

According an aspect of the present invention, a slide rail assembly comprises a first rail, a second rail, a first slide-aiding device and a second slide-aiding device. The second rail is displaceable relative to the first rail in a longitudinal direction. The first slide-aiding device and the second slide-aiding device are both arranged on the first rail. The first slide-aiding device and the second slide-aiding device both comprise a plurality of rolling members. Wherein, when the second rail is at a retracted position relative to the first rail, the plurality of rolling members of the first slide-aiding device and the plurality of rolling members of the second slide-aiding device support different sections of the second rail. When the second rail displaces from the retracted position in a first direction for a pre-determined opening range, the second slide-aiding device follows the second rail and displaces to a pre-determined position in the first direction.

Preferably, the second rail comprises a front section and a rear section; when the second rail is at the retracted position relative to the first rail, the plurality of rolling members of the second slide-aiding device supports at least a portion of the rear section of the second rail.

Preferably, the slide rail assembly further comprises a first working member arranged on the first rail, and the second slide-aiding device comprises an engaging portion; when the second slide-aiding device is at the pre-determined position, the second slide-aiding device, via a blocking arrangement between the engaging portion and the first working member which is at a status, is prevented from displacing in a second direction opposite to the first direction.

Preferably, the first working member is movably disposed on the first rail, and the slide rail assembly further comprises a third rail. The first rail is movably disposed between the third rail and the second rail, and the third rail comprises a releasing structure. When the first rail displaces in a second direction relative to the third rail for a pre-determined returning range, the first working member is driven by the releasing structure to no longer be at the status, such that the second slide-aiding device can displace in the second direction from the pre-determined position.

Preferably, the slide rail assembly further comprises a first resilient member that provides an elastic force to the first working member.

Preferably, the first rail further comprises a first limiting feature; when the second slide-aiding device is at the pre-determined position, the second slide-aiding device and the first limiting feature block each other such that the second slide-aiding device at the pre-determined position is prevented from displacing in the first direction.

Preferably, the slide rail assembly further comprises a second working member arranged on the first rail; when the second rail at the retracted position displaces in the first direction relative to the first rail, the second rail, via the second working member, drives the first rail to synchronously displace with the second rail in the first direction relative to the third rail.

Preferably, the second working member is movably disposed on the first rail, and the slide rail assembly further comprises a second resilient member that provides an elastic force to the second working member.

Preferably, the first rail comprises a first wall, a second wall and a longitudinal wall connected between the first wall and the second wall of the first rail, and the first wall, the second wall and the longitudinal wall of the first rail collectively define a passage that contains the second rail.

Preferably, the second rail comprises a first wall, a second wall and a longitudinal wall connected between the first wall and the second wall of the second rail. The second slide-aiding device comprises a first edge portion and a second edge portion, and the plurality of rolling members of the second slide-aiding device is arranged on the first edge portion and the second edge portion of the second slide-aiding device. When the second rail is at the retracted position, the plurality of the rolling members of the second slide-aiding device supports the first wall and the second wall of the second rail.

Preferably, the first slide-aiding device comprises a first edge portion and a second edge portion, and the plurality of rolling members of the first slide-aiding device is arranged on the first edge portion and the second edge portion of the first slide-aiding device to support the first wall and the second wall of the second rail.

According to another aspect of the present invention, a slide rail assembly comprises a first rail, a second rail, a first slide-aiding device, a second slide-aiding device, and a first working member. The second rail is displaceable relative to the first rail. The first slide-aiding device and the second slide-aiding device are both arranged on the first rail. The second slide-aiding device comprises an engaging portion. The first working member is movably disposed on the first rail and can be placed in one of a first status or a second status; wherein, when the second rail is at a retracted position relative to the first rail, the first slide-aiding device and the second slide-aiding device support different sections of the second rail. Wherein, when the second rail displaces from the retracted position in a first direction for a pre-determined opening range, the second slide-aiding device follows the second rail and displaces to a pre-determined position in the first direction. Wherein, when the second slide-aiding device is at the pre-determined position, the second slide-aiding device, via a blocking arrangement between the engaging portion and the first working member which is at the second status, is prevented from displacing in a second direction opposite to the first direction.

Preferably, the slide rail assembly further comprises a third rail and a second working member. The first rail is movably disposed between the third rail and the second rail, and the second working member is movably disposed on the first rail and can be placed in one of a first pre-determined status or a second pre-determined status; when the second rail at the retracted position displaces in the first direction relative to the first rail, the second rail, via the second working member which is at the first pre-determined status, drives the first rail to synchronously displace with the second rail in the first direction relative to the third rail.

Preferably, the third rail is further arranged with a positioning structure, and the positioning structure comprises a guiding feature, a blocking feature and a center feature arranged between the guiding feature and the blocking feature. When the second rail and the first rail continue to synchronously displace in the first direction relative to the third rail, the second working member is guided to the center feature by the guiding feature of the positioning structure, such that the second working member is supported by the center feature of the positioning structure and converts from the first pre-determined status to the second pre-determined status, allowing the second rail and the first rail to no longer synchronously displace in the first direction relative to the third rail.

Preferably, when the first rail displaces to an extended position in the first direction relative to the third rail, the second working member at the first pre-determined status can engage the blocking feature of the positioning structure to prevent the first rail at the extended position from displacing in the second direction relative to the third rail.

Preferably, when the second rail displaces from an open position for a range in the second direction relative to the first rail, the second rail pushes against the second working member such that the second working member converts from the first pre-determined status to the second pre-determined status, allowing the second working member to disengage from the blocking feature of the positioning structure, thereby letting the first rail at the extended position to displace in the second direction.

Preferably, the first working member comprises a driving feature. When the second rail continues to displace in the second direction, the second rail contacts the driving feature of the first working member which is at the second status, such that the second rail and the first rail can synchronously displace in the second direction relative to the third rail, letting the second rail and an end of the first rail maintain a pre-determined spacing.

Preferably, the third rail is further arranged with a releasing structure. When the second rail and the first rail displace in a second direction relative to the third rail for a pre-determined returning range, the first working member is driven by the releasing structure to convert from the second status to the first status, allowing the second slide-aiding device to displace from the pre-determined position in the second direction.

Preferably, the slide rail assembly further comprises a first resilient member that provides an elastic force to the first working member.

Preferably, the slide rail assembly further comprising a second resilient member that provides an elastic force to the second working member.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 17 is a diagram illustrating the second rail and the first rail of the slide rail assembly no longer synchronously displacing in the second direction relative to the third rail according to the embodiment of the present invention; and FIG. 18 is a diagram illustrating a partial view of the slide rail assembly at the retracted status according to the embodiment of the present invention.

DETAILED DESCRIPTION

Figure 1:
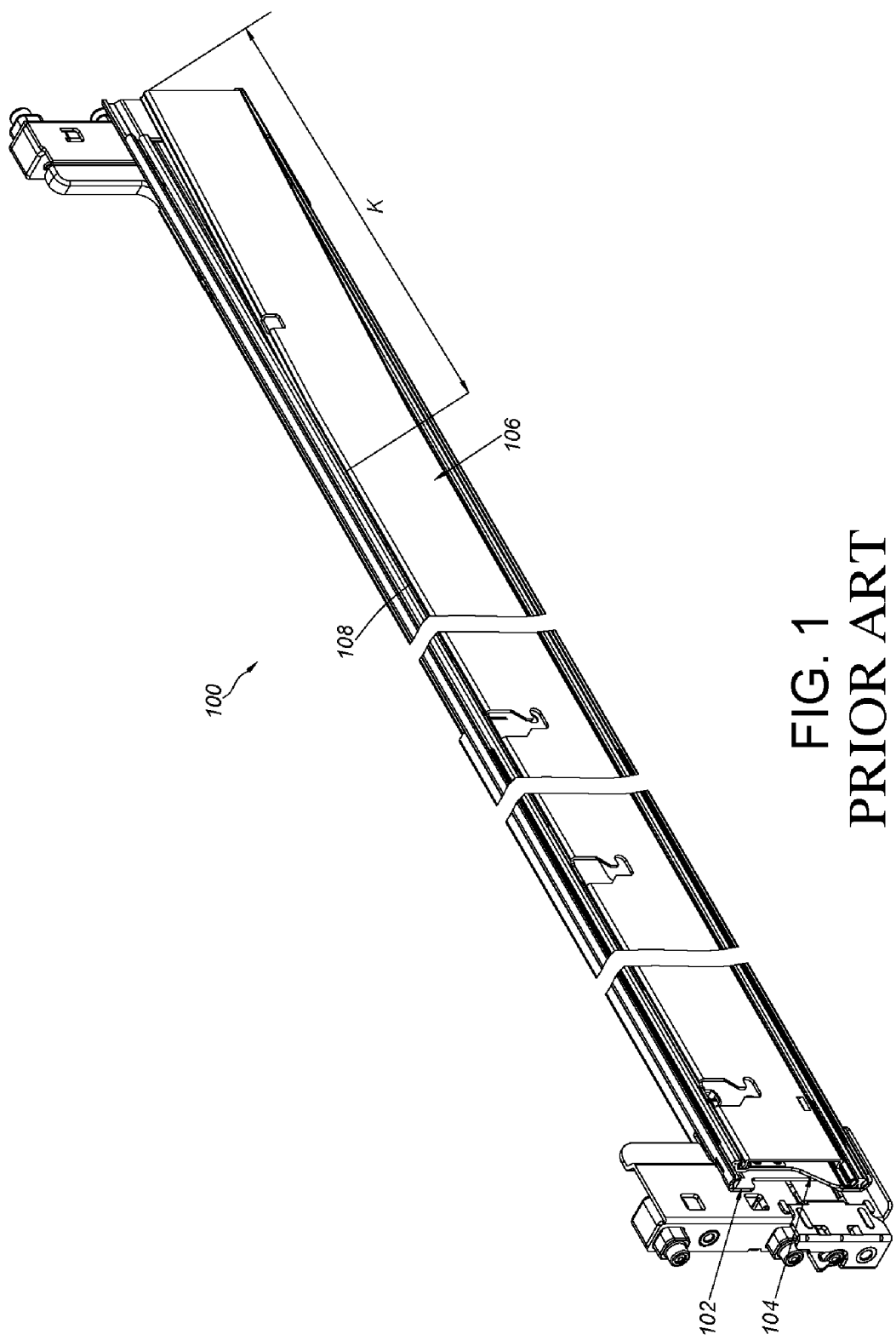
FIG. 1 is a schematic diagram illustrating a slide rail assembly of a prior art.
Figure 2:
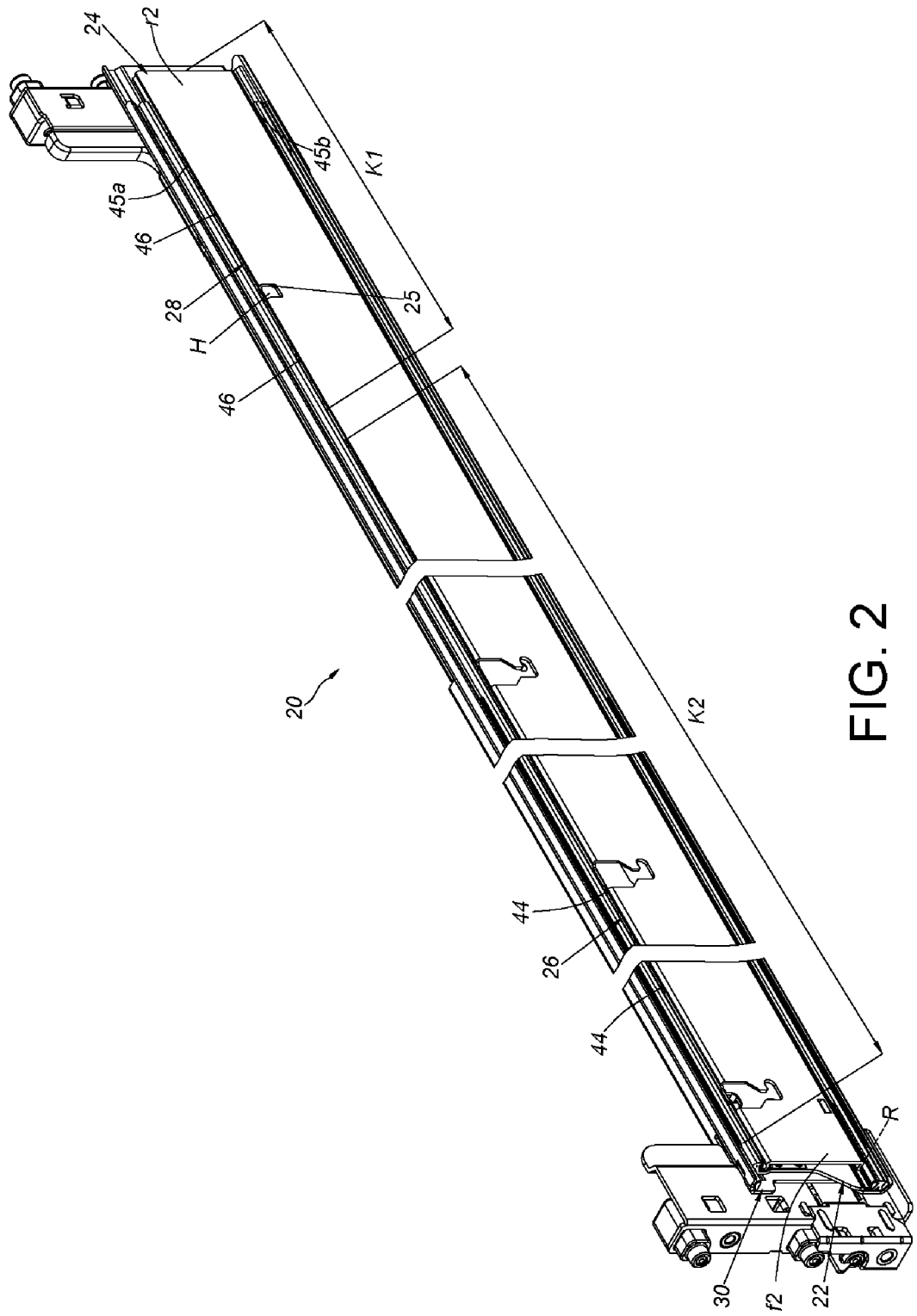
FIG. 2 is a schematic diagram illustrating a slide rail assembly according to an embodiment of the present invention.
Figure 3:
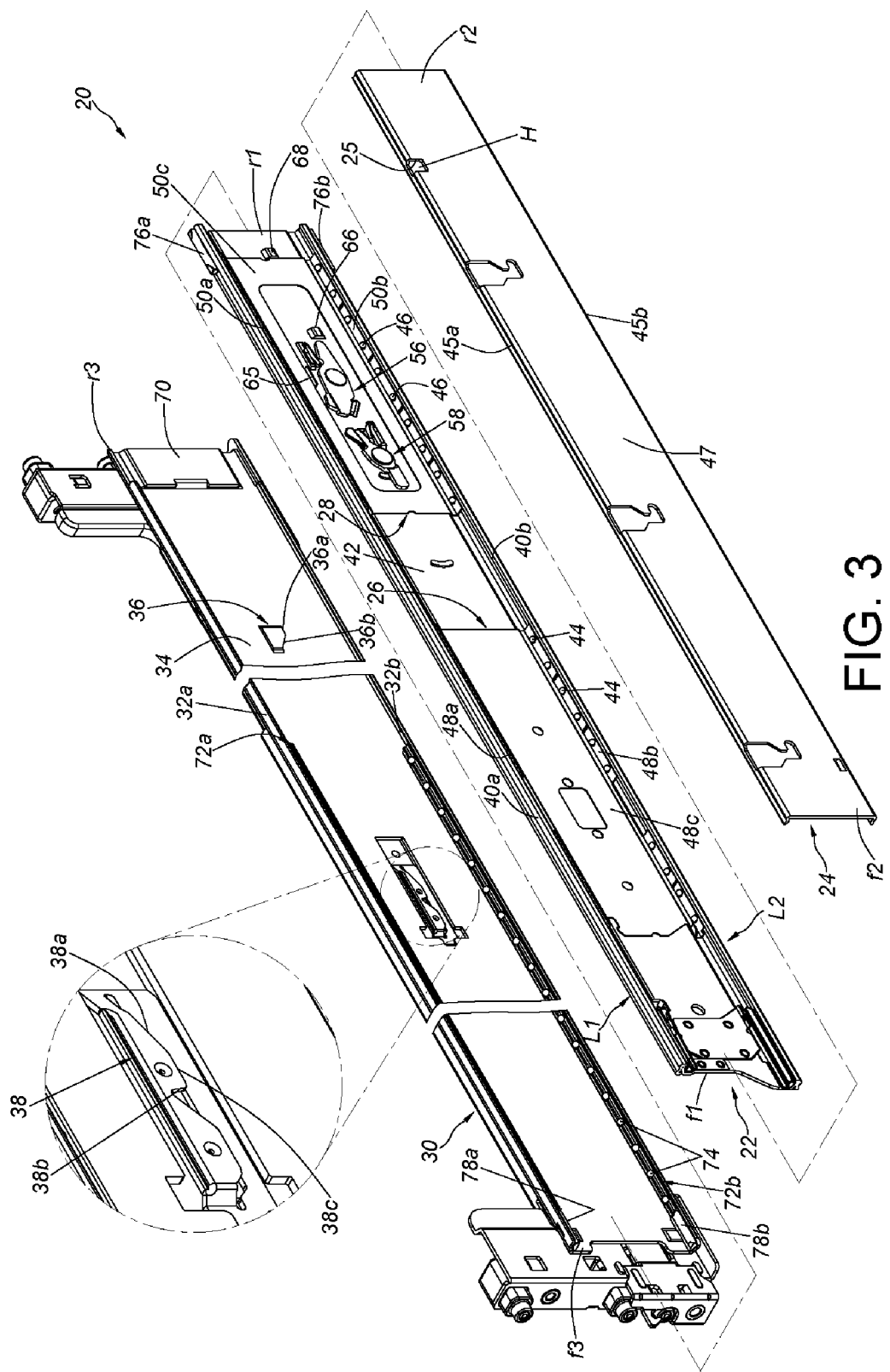
FIG. 3 is an exploded diagram of a first rail, a second rail, and a third rail of the slide rail assembly according to the embodiment of the present invention.

As shown in FIGS. 2 and 3, the slide rail assembly 20 according to the embodiment of the present invention comprises a first rail 22, a second rail 24, a first slide-aiding device 26 and a second slide-aiding device 28. Preferably, the slide rail assembly 20 further comprises a third rail 30. Wherein, the first rail 22 is movably disposed between the third rail 30 and the second rail 24.

The third rail 30 comprises a first wall 32a, a second wall 32b and a longitudinal wall 34 connected between the first wall 32a and the second wall 32b of the third rail 30. The first wall 32a, the second wall 32b and the longitudinal wall 34 of the third rail 30 collectively define a passage containing the first rail 22. Additionally, the third rail 30 has a front end f3 and a rear end r3. Preferably, the longitudinal wall 34 of the third rail 30 is arranged with a releasing structure 36 and a positioning structure 38. Wherein, the releasing structure 36 is closer to the rear end r3 of the third rail 30 when compared to the positioning structure 38. On the other hand, the positioning structure 38 is farther from the rear end r3 of the third rail 30 when compared to the releasing structure 36.

Preferably, the releasing structure 36 comprises a supporting portion 36a and a disengaging portion 36b adjacent to the supporting portion 36a, wherein a sloped surface or a curved surface is illustrative of (but not limited to) an example of the disengaging portion 36b herein.

Preferably, the positioning structure 38 comprises a guiding feature 38a, a blocking feature 38b and a center feature 38c arranged between the guiding feature 38a and the blocking feature 38b. A sloped surface or a curved surface is illustrative of an example of the guiding feature 38a, a wall or an indentation is illustrative of an example of the blocking feature 38b, and the center feature 38c is substantially a flat surface; however, in practical applications, the features are not limited to the above-mentioned configurations.

The first rail 22 comprises a first wall 40a, a second wall 40b and a longitudinal wall 42 connected between the first wall 40a and the second wall 40b of the first rail 22. The first wall 40a, the second wall 40b and the longitudinal wall 42 of the first rail 22 collectively define a passage containing the second rail 24. Additionally, the first rail 22 comprises a front end f1 and a rear end r1.

The first slide-aiding device 26 and the second slide-aiding device 28 are arranged on the first rail 22. Preferably, the first slide-aiding device 26 and the second slide-aiding device 28 are arranged inside the passage of the first rail 22. Here, the first slide-aiding device 26 and the second slide-aiding device 28 both comprise a plurality of rolling members. For example, the first slide-aiding device 26 comprises a plurality of first rolling members 44, and the second slide-aiding device 28 comprises a plurality of second rolling members 46. The plurality of rolling members 44, 46 can be ball bearings or wheels, but are not limited thereto in practical applications.

The second rail 24 comprises a first wall 45a, a second wall 45b, and a longitudinal wall 47 connected between the first wall 45a and the second wall 45b of the second rail 24. Additionally, the second rail 24 has a front end f2 and a rear end r2. The second rail 24 comprises a synchronizing feature 25. A wall of a hole H is illustrative of the synchronizing feature 25, but is not limited thereto in practical applications.

Preferably, the first slide-aiding device 26 comprises a first edge portion 48a, a second edge portion 48b and a longitudinal portion 48c connected between the first edge portion 48a and the second edge portion 48b. The positions of the first edge portion 48a, the second edge portion 48b and the longitudinal portion 48c of the first slide-aiding device 26 correspond to the positions of the first wall 40a, the second wall 40b and the longitudinal wall 42 of the first rail 22, respectively. The plurality of first rolling members 44 of the first slide-aiding device 26 are arranged on the first edge portion 48a and the second edge portion 48b of the first slide-aiding device 26.

Preferably, the second slide-aiding device 28 comprises a first edge portion 50a, a second edge portion 50b and a longitudinal portion 50c connected between the first edge portion 50a and the second edge portion 50b. The positions of the first edge portion 50a, the second edge portion 50b and the longitudinal portion 50c of the second slide-aiding device 28 correspond to the positions of the first wall 40a, the second wall 40b and the longitudinal wall 42 of the first rail 22, respectively. The plurality of second rolling members 46 of the second slide-aiding device 28 is arranged on the first edge portion 50a and the second edge portion 50b of the second slide-aiding device 28.

When the second rail 24 is at a retracted position R relative to the first rail 22, the first slide-aiding device 26 and the second slide-aiding device 28 supports different sections of the second rail 24 (as shown in FIG. 2).

Figure 5:
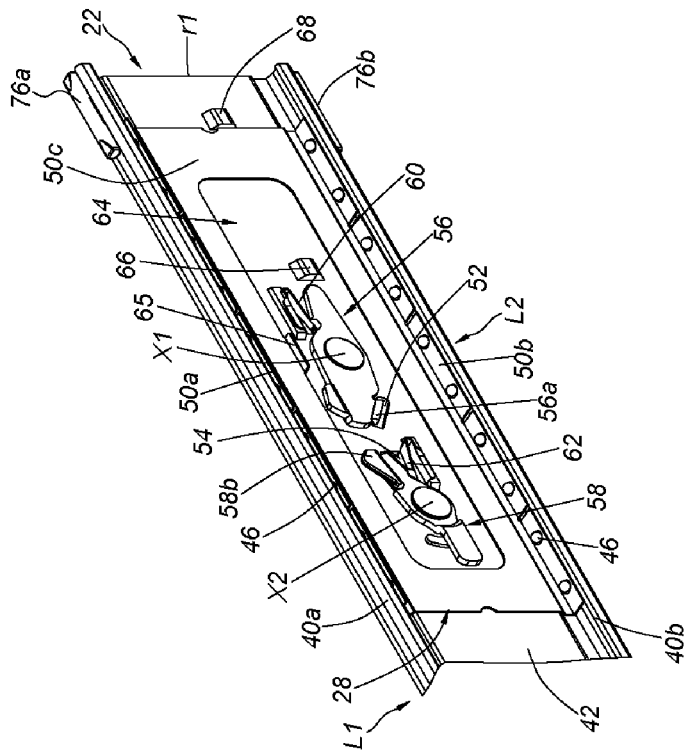
FIG. 5 is a diagram illustrating the two working members assembled on the first rail according to the embodiment of the present invention.
Figure 4:
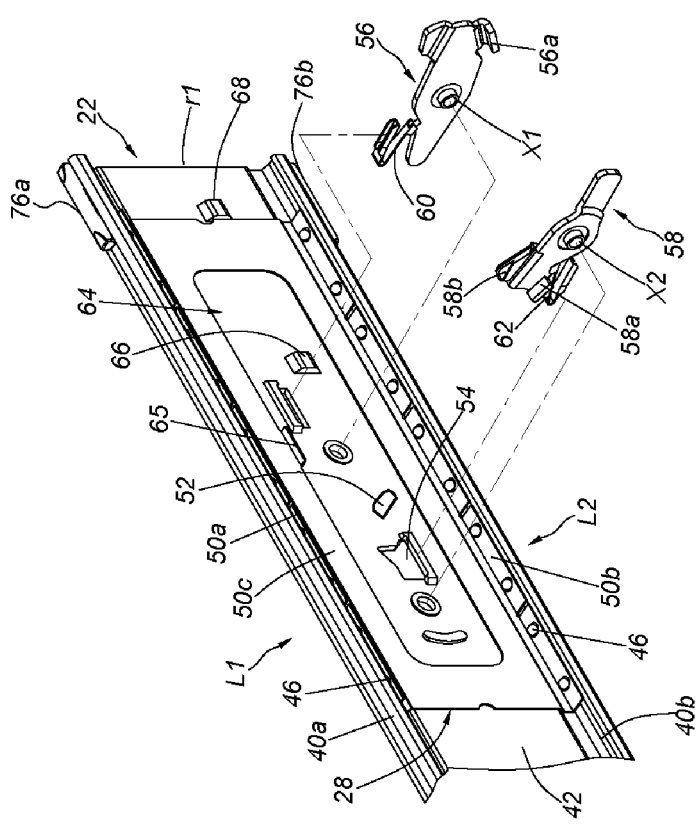
FIG. 4 is an exploded diagram of the first rail and two working members according to the embodiment of the present invention.

As shown in FIGS. 3, 4, and 5, the longitudinal wall 42 of the first rail 22 has a first opening 52 and a second opening 54, wherein the first opening 52 and the second opening 54 pass through and connect a first side L1 and a second side L2 of the longitudinal wall 42 of the first rail 22. The first side L1 is adjacent to (the longitudinal wall 34 of) the third rail 30, and the second side L2 is adjacent to (the longitudinal wall 47 of) the second rail 24.

Preferably, the slide rail assembly 20 further comprises a first working member 56 and a second working member 58 arranged on the first rail 22. Here, the first working member 56 and the second working member 58 are movably disposed on the first rail 22. As an example, the first working member 56 and the second working member 58 may be pivotally connected to the longitudinal wall 42 of the first rail 22 through a first axis X1 and a second axis X2.

Preferably, the slide rail assembly 20 further comprises a first resilient member 60 and a second resilient member 62 to provide an elastic force to the first working member 56 and the second working member 58, respectively.

Preferably, the longitudinal portion 50c of the second slide-aiding device 28 has a space 64, and the first working member 56 and the second working member 58 are positioned inside the space 64.

Preferably, the second slide-aiding device 28 comprises an engaging portion 65. As an example, the engaging portion 65 is arranged on the longitudinal portion 50c of the second slide-aiding device 28, and the engaging portion 65 is adjacent to the space 64. A protrusion is illustrative of the engaging portion 65, but is not limited thereto in practical applications.

Preferably, the first rail 22 further comprises a first limiting feature 66 and a second limiting feature 68. A protrusion is illustrative of the first limiting feature 66 and the second limiting feature 68, but is not limited thereto in practical applications. The purpose of the first limiting feature 66 and the second limiting feature 68 is to limit the second slide-aiding device 28 to displacing in a longitudinal direction within a restricted or specified range relative to the first rail 22.

Preferably, the first working member 56 has a first extended portion 56a, and the first extended portion 56a passes through the first opening 52 of the first rail 22 to point toward the longitudinal wall 34 of the third rail 30. On the other hand, the second working member 58 has a second extended portion 58a that passes through the second opening 54 of the first rail 22 to point toward the longitudinal wall 34 of the third rail 30. The second working member 58 also has a corresponding feature 58b that is used in tandem with the synchronizing feature 25.

Figure 6:
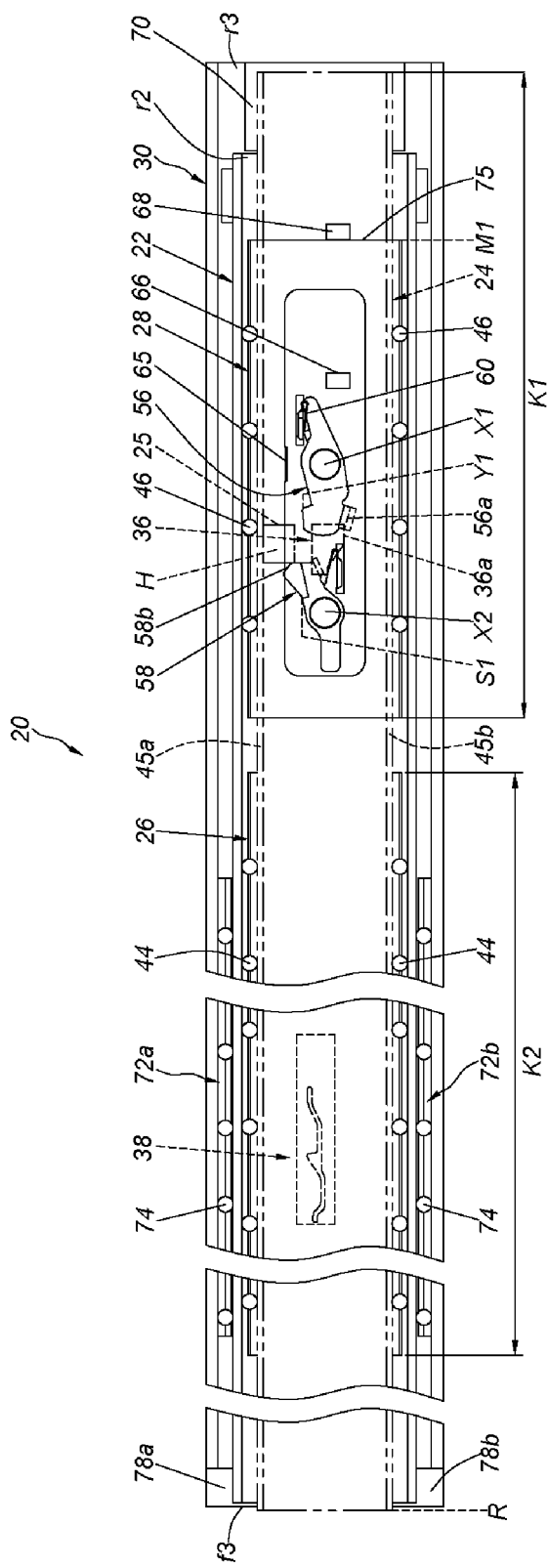
FIG. 6 is a diagram illustrating the slide rail assembly at a retracted status according to the embodiment of the present invention.

As shown in FIG. 6, the slide rail assembly 20 is at a retracted status; wherein, the first rail 22 is retracted relative to the third rail 30, and the second rail 24 is retracted relative to the first rail 22.

Preferably, an area adjacent to the rear end r3 of the third rail 30 is arranged with a rear blocking structure 70 (such as a protrusion, also shown in FIG. 3). When the first rail 22 is retracted relative to the third rail 30, the rear end r3 of the first rail 22 can abut the rear blocking structure 70.

Preferably, the slide rail assembly 20 further comprises at least one slide-aiding structure arranged on a passage of the third rail 30, and the slide-aiding structure is used to support the first rail 22. Herein, the first slide-aiding structure comprising a first slide-aiding portion 72a and a second slide-aiding portion 72b is illustrative of an example, but the number of slide-aiding portions is not limited thereto in practical applications. The first slide-aiding portion 72a and the second slide-aiding portion 72b support the first wall 40a and the second wall 40b of the first rail 22, respectively, and the first slide-aiding portion 72a and the second slide-aiding portion 72b comprise a plurality of third rolling members 74, such as ball bearings or wheels, to assist in the relative displacement of the first rail 22 relative to the third rail 30. Preferably, the first rail 22 has at least one pushing portion, such as a first pushing portion 76a and a second pushing portion 76b. An area adjacent to the front end f3 of the third rail 30 is arranged with at least one front blocking structure, such as a first front blocking structure 78a and a second front blocking structure 78b. The first slide-aiding portion 72a is between the first pushing portion 76a and the first front blocking structure 78a, and the second slide-aiding portion 72b is between the second pushing portion 76b and the second front blocking structure 78b.

Furthermore, the second rail 24 has a front section, a middle section, and a rear section K1. When the second rail 24 is at the retracted position R relative to the first rail 22, the plurality of first rolling members 44 of the first slide-aiding device 26 and the plurality of second rolling members 46 of the second slide-aiding device 28 support different sections of the second rail 24. Wherein, the plurality of second rolling members 46 supports at least a portion of the first wall 45a and the second wall 45b of the rear section K1 of the second rail 24 (also illustrated in FIG. 2), and the plurality of first rolling members 44 of the first slide-aiding device 26 supports a section K2 other than the rear section K1 of the second rail 24 (also illustrated in FIG. 2). For example, the plurality of first rolling members 44 of the first slide-aiding device 26 supports the middle section and/or a portion of the front section of the first wall 45a and the second wall 45b of the second rail 24. Additionally, the second working member 58 and the positioning structure 38 have a pre-determined longitudinal distance therebetween. Wherein, the second working member 58, via the second resilient member 62 releasing an elastic force, can remain at a first pre-determined status S1; on the other hand, the first working member 56, via the first extended portion 56a being supported by the supporting portion 36a of the releasing structure 36, thereby causing the first resilient member 60 to accumulate an elastic force, can remain at a first status Y1. Furthermore, the second slide-aiding device 28 is at an initial position M1, and a first setting portion 75 can abut the second limiting feature 68 of the second slide-aiding device 28. The synchronizing feature 25 of the second rail 24 and the corresponding feature 58b of the second working member 58 have a distance therebetween.

Figure 7:
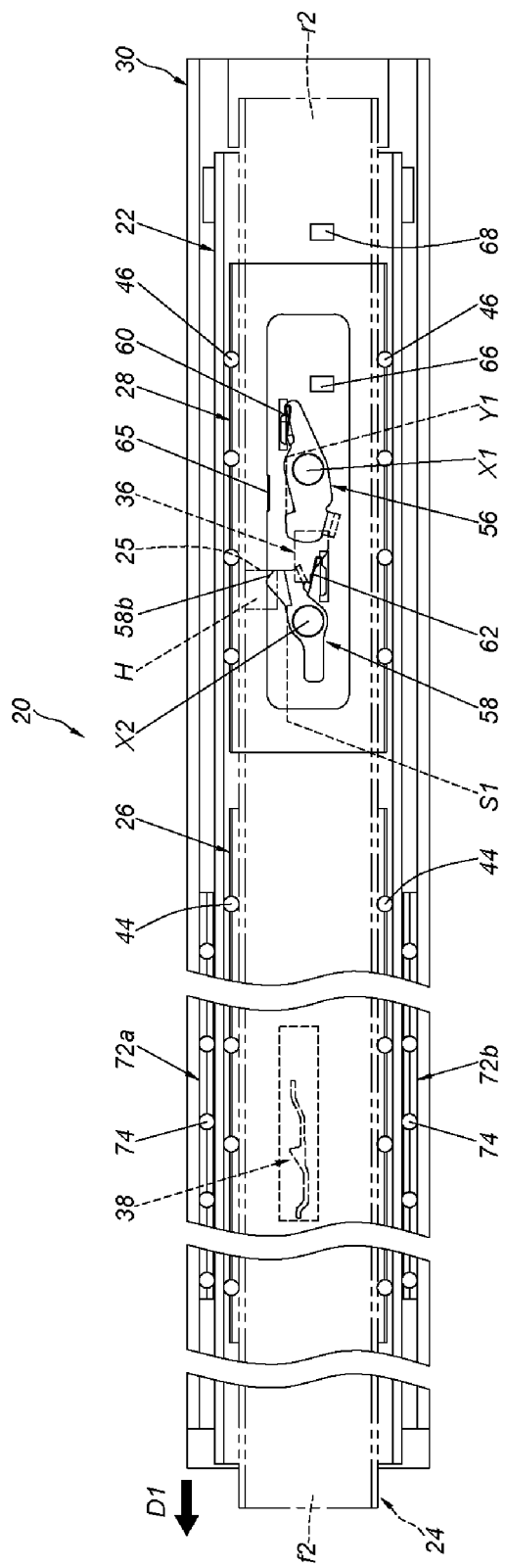
FIG. 7 is a diagram illustrating the first rail and the second rail of the slide rail assembly displacing in a first direction relative to the third rail according to the embodiment of the present invention.

As shown in FIG. 7, when the second rail 24 displaces longitudinally from the above-mentioned retracted position R in a first direction D1 for a distance relative to the first rail 22, the synchronizing feature 25 of the second rail 24 contacts the corresponding feature 58b of the second working member 58. At this time, the first slide-aiding device 26 and the second slide-aiding device 28 also displace in the first direction D1.

Figure 8:
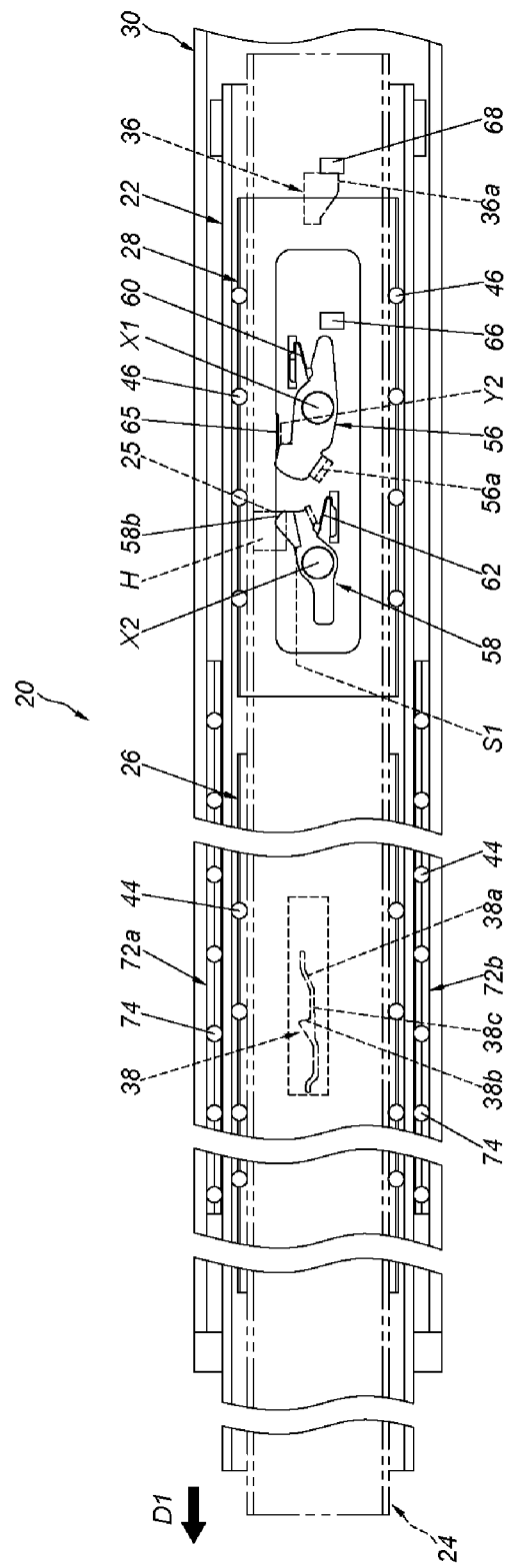
FIG. 8 is a diagram illustrating the first rail and the second rail of the slide rail assembly synchronously displacing in the first direction relative to the third rail according to the embodiment of the present invention.

As shown in FIG. 8, when the second rail 24 continues to displace from the retracted position R in the first direction D1 relative to the first rail 22, the second rail 24, via the synchronizing feature 25 contacting the corresponding feature 58b of the second working member 58, drives the first rail 22 such that the second rail 24 and the first rail 22 can synchronously displace in the first direction D1 relative to the third rail 30. On the other hand, the first extended portion 56a of the first working member 56 is no longer supported by the supporting portion 36a of the releasing structure 36. Therefore, the first working member 56 converts from the above-mentioned first status Y1 to a second status Y2 via the first resilient member 60 releasing the elastic force.

Figure 9:
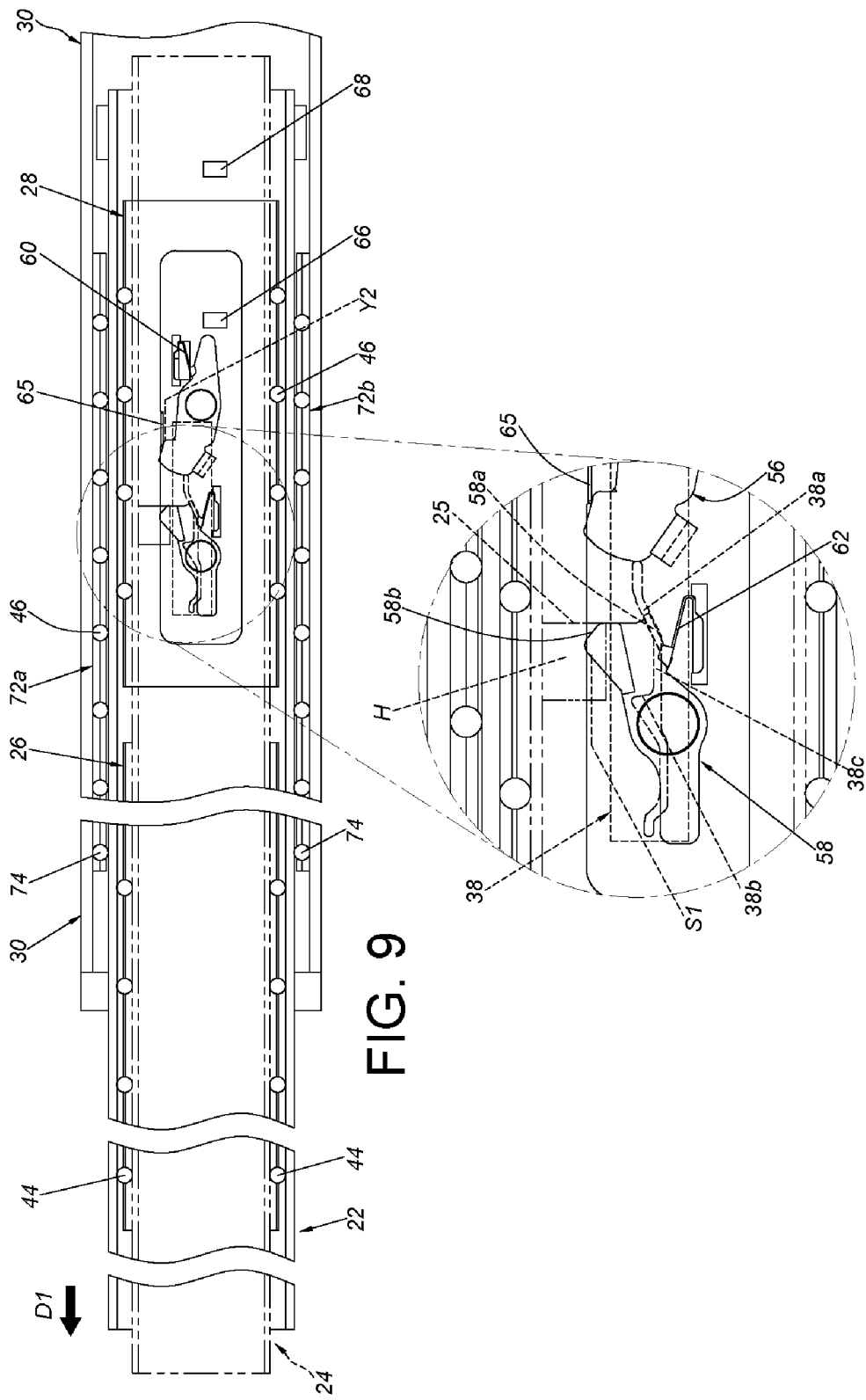
FIG. 9 is a diagram illustrating the first rail and the second rail of the slide rail assembly continuing to synchronously displace in the first direction relative to the third rail according to the embodiment of the present invention.

As shown in FIG. 9, when the second rail 24 and the first rail 22 continues to synchronously displace in the first direction D1 relative to the third rail 30, the second extended portion 58a of the second working member 58 contacts the guiding feature 38a of the positioning structure 38. At this time, the second working member 58 is still at the first pre-determined status S1.

Figure 10:
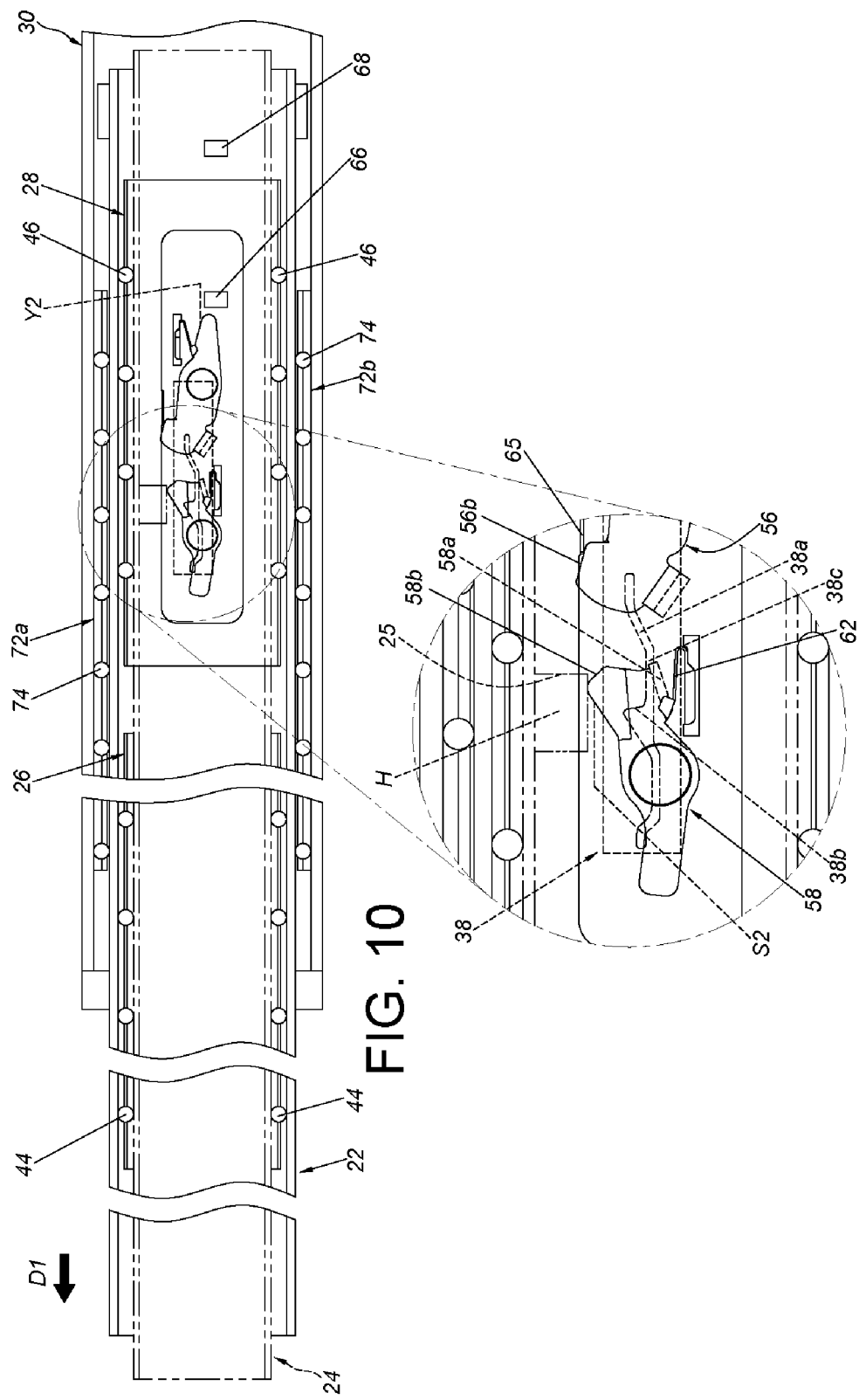
FIG. 10 is a diagram illustrating the first rail and the second rail of the slide rail assembly no longer synchronously displacing in the first direction relative to the third rail according to the embodiment of the present invention.

As shown in FIG. 10, when the second rail 24 and the first rail 22 synchronously displace further in the first direction D1 relative to the third rail 30, the second extended portion 58a of the second working member 58 is guided by the guiding feature 38a of the positioning structure 38 to the center feature 38c, such that the second working member 58 is supported by the center feature 38c of the positioning structure 38 and converts from the above-mentioned first pre-determined status S1 to a second pre-determined status S2, wherein the second resilient member 62 is accumulating the elastic force. Specifically, when the second extended portion 58a of the second working member 58 is guided by the guiding feature 38a, a difference in the projected vertical position (of the diagram) between the guiding feature 38a and the center feature 38c causes the second extended portion 58a to move along an edge of the guiding feature 38a to the center feature 38c. This leads the second working member 58 to rotate and become the second pre-determined status S2. Here, the second extended portion 58a can abut the second resilient member 62 for the second resilient member 62 to accumulate the elastic force. At this time, the second working member 58 is pivoted at an angle to arrive at the second pre-determined status S2. Therefore, the synchronizing feature 25 of the second rail 24 no longer contacts the corresponding feature 58b of the second working member 58. In this manner, the second rail 24 and the first rail 22 no longer synchronously displace in the first direction D1 relative to the third rail 30. In other words, the second rail 24 and the first rail 22 can independently and separately displace in the first direction D1 relative to the third rail 30. Additionally, the engaging portion 65 of the second slide-aiding device 28 can contact a guiding feature 56b of the first working member 56. Preferably, the guiding feature 56b is a sloped surface or a curved surface.

Figure 11:
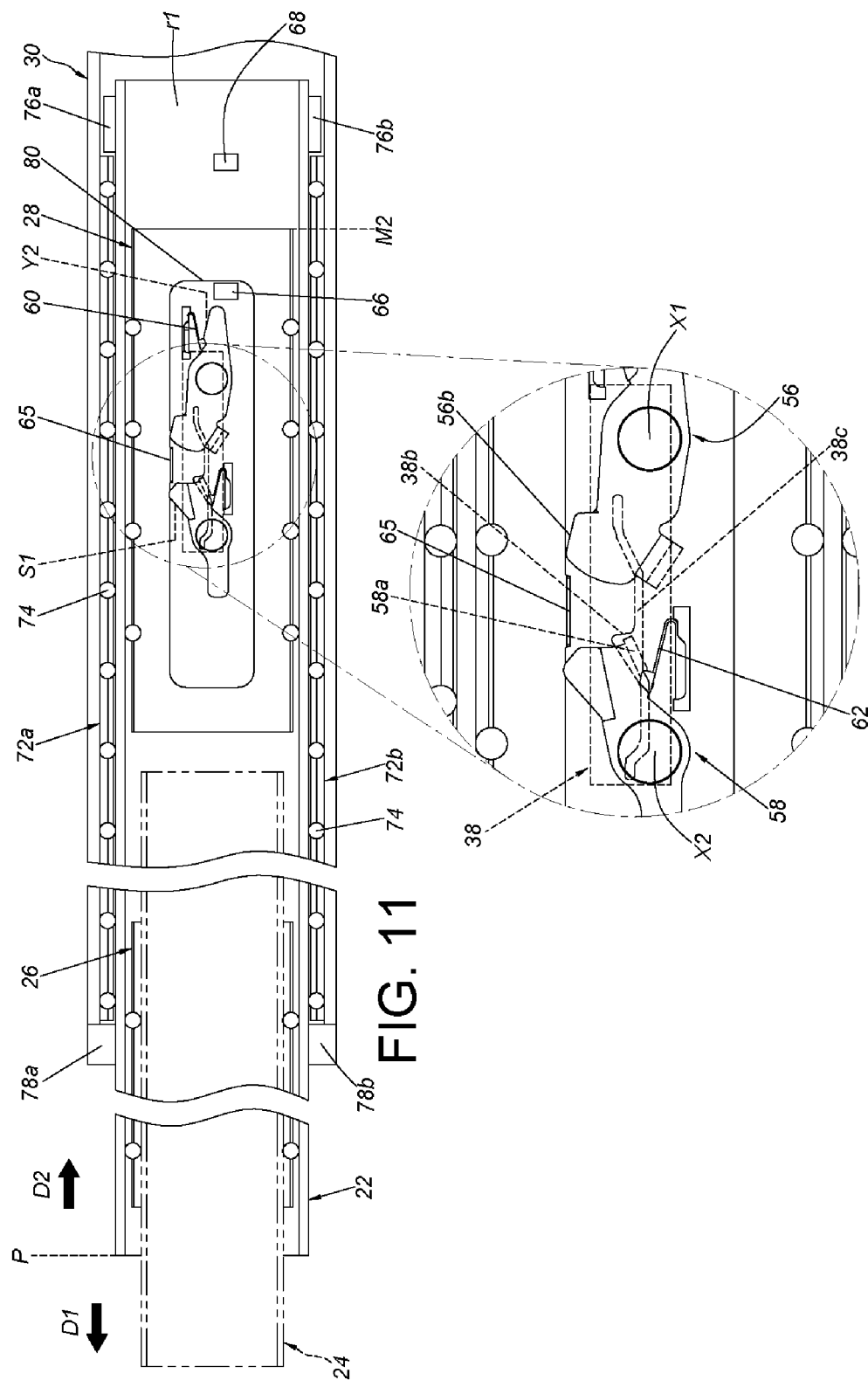
FIG. 11 is a diagram illustrating the slide rail assembly at an extended status according to the embodiment of the present invention.

As shown in FIG. 11, when the first rail 22 displaces to an extended position P in the first direction D1 relative to the third rail 30, the second working member 58 displaces from the center feature 38c to the blocking feature 38b and is restored to the first pre-determined status S1 by responding to the second resilient member 62 releasing the elastic force. Furthermore, the second extended portion 58a of the second working member 58 engages the blocking feature 38b of the positioning structure 38 to prevent the first rail 22 at the extended position P from displacing in a second direction D1 opposite to the first direction D1. Preferably, the first pushing portion 76a and the second pushing portion 76b of the first rail 22 can respectively push against a rear end of the first slide-aiding portion 72a and the second slide-aiding portion 72b in the first direction D1, such that a front end of the first slide-aiding portion 72a and the second slide-aiding portion 72b can respectively be blocked by the first front blocking structure 78a and the second front blocking structure 78b of the third rail 30.

Additionally, when the first rail 22 is at the extended position P relative to the third rail 30, the second rail 24 can still continue to displace in the first direction D1 relative to the first rail 22 so that the slide rail assembly 20 can be at an extended status. Specifically, when the first rail 22 is at the extended position P, and the second rail 24 displaces for a pre-determined opening range in the first direction D1 relative to the first rail 22, the second slide-aiding device 28 follows the second rail 24 and displaces to a pre-determined position M2 in the first direction D1. A second setting portion 80 of the second slide-aiding device 28 can then abut the first limiting feature 66, such that the second slide-aiding device 28 and the first limiting feature 66 can abut each other to prevent the second slide-aiding device 28 at the pre-determined position M2 from displacing in the first direction D1. When the second slide-aiding device 28 is at the pre-determined position M2, the second slide-aiding device 28, via a blocking arrangement between the engaging portion 65 and the first working member 56 that is at the second status Y2, is prevented from displacing in the second direction D2. In other replacement or alternative embodiments in which the second slide-aiding device 28 is at the pre-determined position M2, the second slide-aiding device 28 can be blocked between the first working member 56 that is at the second status Y2 and the second working member 58 that is at the first pre-determined status S1 through the engaging portion 65 being between the first working member 56 and the second working member 58. In this manner, the second slide-aiding device 28 at the pre-determined position M2 can be prevented from displacing in the first direction D1 or the second direction D2.

It is worth mentioning that, during the process of the second slide-aiding device 28 displacing to the pre-determined position M2 in the first direction D1, the second slide-aiding device 28 (via the engaging portion 65) can push against the guiding feature 56b of the first working member 56 to slightly rotate the first working member 56. After the engaging portion 65 of the second slide-aiding device 28 passes over the first working member 56, the second slide-aiding device 28 can be at the pre-determined position M2, and the first working member 56 can remain at the second status Y2 via the elastic force of the first resilient member 60. Or, in a status not shown in the present application, the present invention can be designed for the engaging portion 65 of the second slide-aiding device 28 to pass over the first working member 56 first; the first working member 56 can then be converted from the first status Y1 to the second status Y2 via the releasing structure 36. Both embodiments are applicable in the present invention depending on demand.

Figure 12:
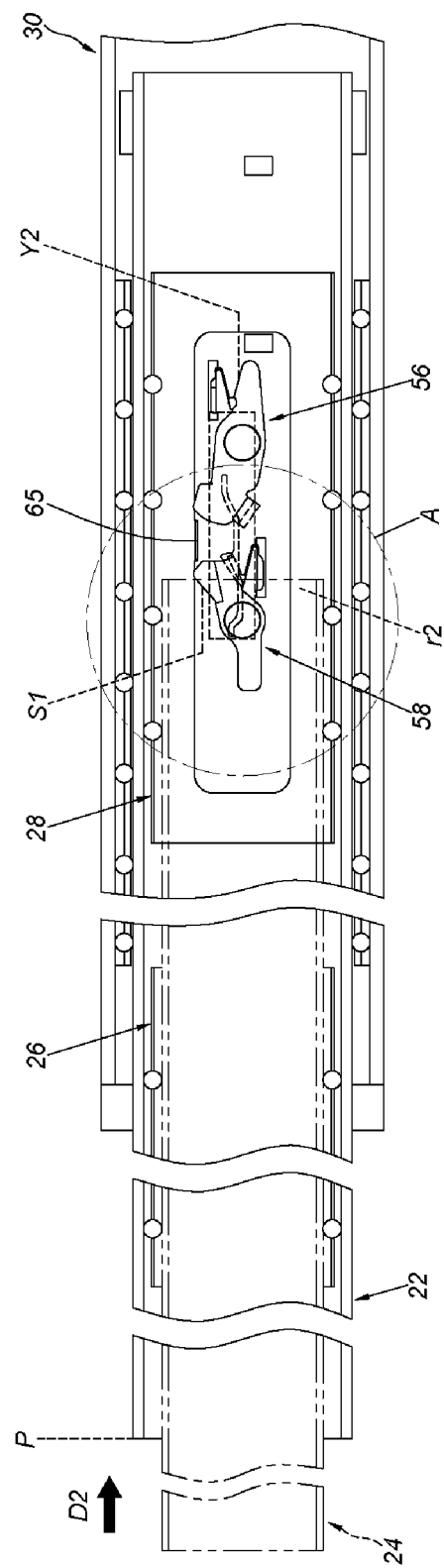
FIG. 12 is a diagram illustrating the first rail of the slide rail assembly at an extended position relative to the third rail, and the second rail displacing in a second direction relative to the first rail according to the embodiment of the present invention.
Figure 13:
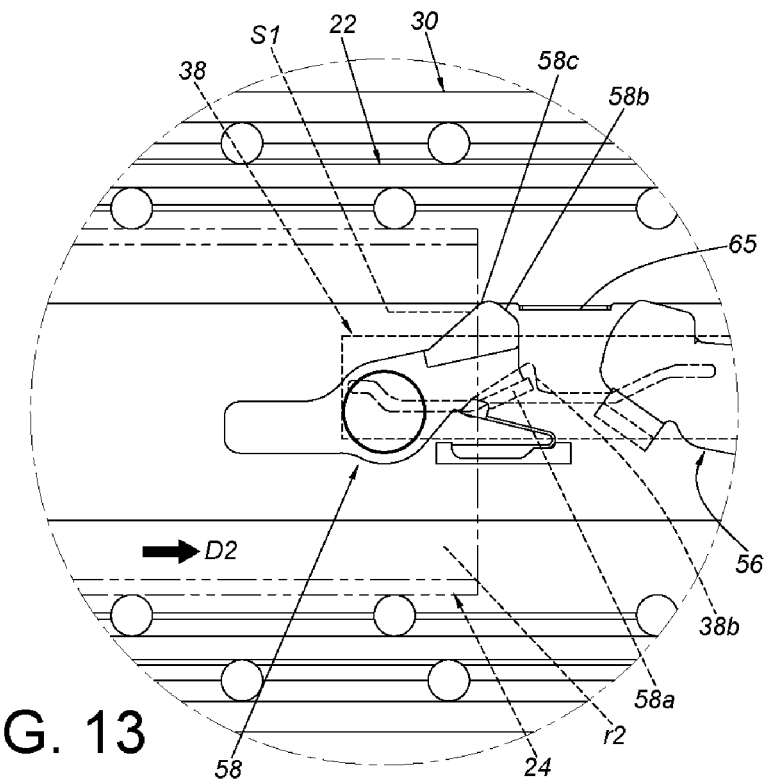
FIG. 13 is a diagram illustrating an enlarged area A of FIG. 12.
Figure 14:
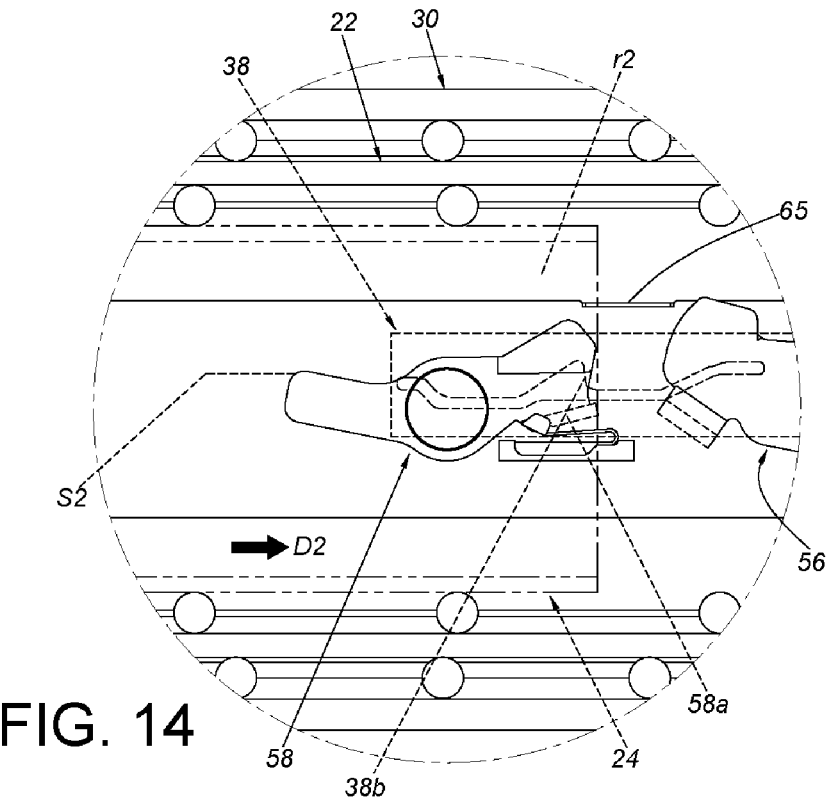
FIG. 14 is a diagram illustrating the first rail of the slide rail assembly at an extended position relative to the third rail, and the second rail continuing to displace in the second direction relative to the first rail according to the embodiment of the present invention.

As shown in FIGS. 12, 13, and 14, the second working member 58 further comprises a disengaging portion 58c; the disengaging portion 58c being adjacent to the corresponding feature 58b is illustrative of an example herein.

When the second rail 24 that is at an open position (such as a completely extended position but not limited thereto) displaces in the second direction D2 relative to the first rail 22 for a range, a portion of the second rail 24 (such as a rear end r2 of the second rail 24 but not limited thereto) can abut against the disengaging portion 58c of the second working member 58 such that the second working member 58 converts from the first pre-determined status S1 (shown in FIGS. 12 and 13) to the second pre-determined status S2 (shown in FIG. 14) in order for the second extended portion 58a of the second working member 58 to disengage from the blocking feature 38b of the positioning structure 38. This in turn allows the first rail 22 to displace from the extended position P (shown in FIG. 12) in the second direction D2.

Figure 15:
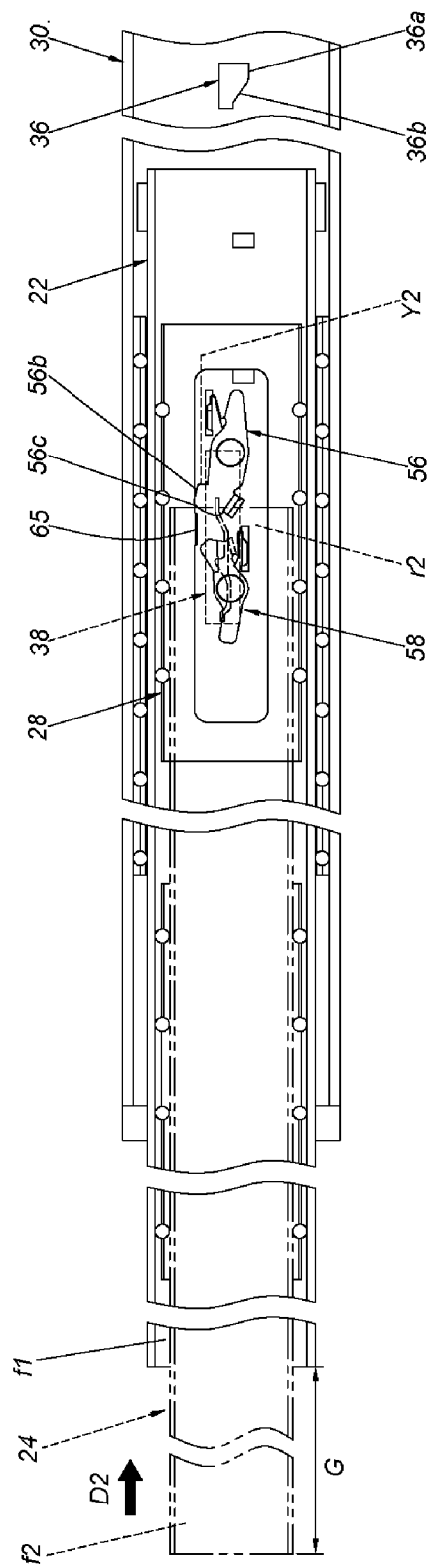
FIG. 15 is a diagram illustrating the second rail and the first rail of the slide rail assembly synchronously displacing in the second direction relative to the third rail according to the embodiment of the present invention.

As shown in FIG. 15, the first working member 56 further comprises a driving feature 56c, the driving feature 56c being adjacent to the guiding feature 56b is illustrative of an example herein. When the second rail 24 continues to displace in the second direction D2, the portion of the second rail 24 (such as the rear end r2 of the second rail 24 but not limited thereto) contacts the driving feature 56c of the first working member 56 that is at the second status Y2, such that the second rail 24 and the first rail 22 can synchronously displace in the second direction D2 relative to the third rail 30. Additionally, the first working member 56 and the releasing structure 36 have a longitudinal distance therebetween. It is worth mentioning that the synchronous displacement of the second rail 24 and the first rail 22 in the second direction D2 has benefits such as the following: a pre-determined spacing G can be maintained between ends of the second rail 24 and the first rail 22 (such as the front ends f2 and f1 of the two rails) to prevent a user's fingers from being pinched during the process of retracting the second rail 24 in the second direction D2 relative to the first rail 22 due to the shortening of the pre-determined spacing G; or, if the second rail 24 is fitted with a carried object, by synchronously displacing the second rail 24 and the first rail 22 in the second direction D2, the overall carrying capacity of the structure can thereby be increased.

Figure 16:
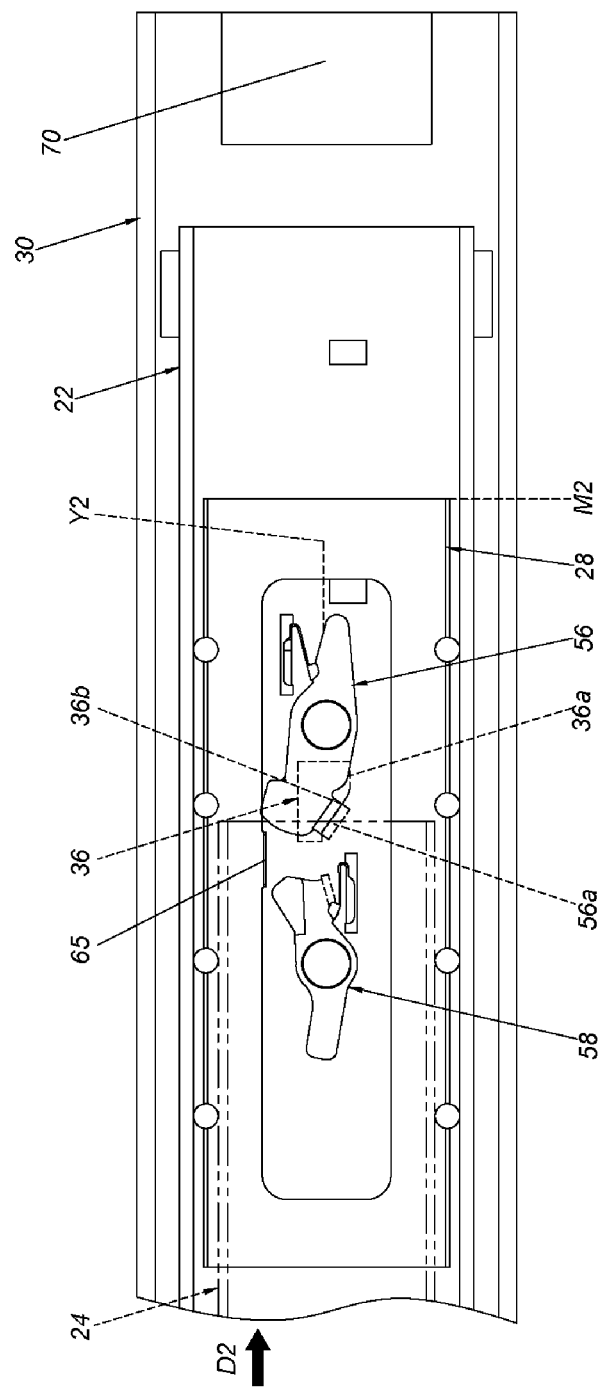
FIG. 16 is a diagram illustrating the second rail and the first rail of the slide rail assembly continuing to synchronously displace in the second direction relative to the third rail according to the embodiment of the present invention.

As shown in FIG. 16, when the second rail 24 and the first rail 22 continue to synchronously displace in the second direction D2 relative to the third rail 30, the first extended portion 56a of the first working member 56 will contact the disengaging portion 36b of the releasing structure 36.

As shown in FIG. 17, when the second rail 24 and the first rail 22 further displace for a pre-determined returning range in the second direction D2 relative to the third rail 30, the first extended portion 56a of the first working member 56 is driven by the disengaging portion 36b of the releasing structure 36 to arrive at the supporting portion 36a, such that the first working member 56 is no longer at the status (for example, the first working member 56 is restored from the above-mentioned second status Y2 to the first status Y1). That is, the blocking arrangement between the engaging portion 65 and the first working member 56 no longer exist because the first working member 56 cannot block the engaging portion 65 from displacing in the second direction D2. Therefore, the second slide-aiding device 28 is allowed to displace from the above mentioned pre-determined position M2 in the second direction D2. In this manner, the first rail 22 can retract relative to the third rail 30.

As shown in FIG. 18, after the first rail 22 is retracted relative to the third rail 30, the second rail 24 can displace in the second direction D2 relative to the first rail 22, and the second slide-aiding device 28 can also displace in the second direction D2 until the slide rail assembly 20 is returned to the above-mentioned retracted status.

It can be seen from the aforementioned embodiments that the present invention includes the following advantages:

1. When the second rail 24 is at the retracted position R relative to the first rail 22, the plurality of first rolling members 44 of the first slide-aiding device 26 and the plurality of second rolling members 46 of the second slide-aiding device 28 supports different portions of the second rail 24. Wherein, the plurality of second rolling members 46 of the second slide-aiding device 28 supports at least a portion of the rear section K1 of the second rail 24.

2. The second slide-aiding device 28 can displace relative to the first rail 22. When the second slide-aiding device 28 displaces to the pre-determined position M2 in the first direction D1, the second slide-aiding device 28 can, through a blocking arrangement between the engaging portion 65 and the first working member 56 that is at the second status Y2, be prevented from displacing in the second direction D2.

3. When the second rail 24 displaces in the second direction D2 from an open position, a portion of the second rail 24 (such as the rear end r2 of the second rail 24) contacts the driving feature 56c of the first working member 56 at the second status Y2, such that the second rail 24 and the first rail 22 can synchronously displace in the second direction D2 relative to the third rail 30. The benefit of such arrangement include, for example, maintaining a pre-determined spacing G between ends of the second rail 24 and the first rail 22 (such as the front ends f2 and f1 of the two rails) to prevent a user's fingers from being pinched during the process of retracting the second rail 24 in the second direction D2 relative to the first rail 22 due to the shortening of the pre-determined spacing G.

4. When the second rail 24 and the first rail 22 displace for a pre-determined returning range in the second direction D2 relative to the third rail 30, the first working member 56 at the second status Y2 is driven by the disengaging portion 36b of the releasing structure 36 to convert to the first status Y1, thereby allowing the second slide-aiding device 28 to displace from the pre-determined position M2 in the second direction D2.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A slide rail assembly, comprising:
a first rail;
a second rail displaceable relative to the first rail in a longitudinal direction; and
a first slide-aiding device and a second slide-aiding device, which are both arranged on the first rail, wherein the first slide-aiding device and the second slide-aiding device both comprise a plurality of rolling members;
wherein, when the second rail is at a retracted position relative to the first rail, the plurality of rolling members of the first slide-aiding device and the plurality of rolling members of the second slide-aiding device support different sections of the second rail;
wherein, when the second rail displaces from the retracted position in a first direction for a pre-determined opening range, the second slide-aiding device follows the second rail and displaces to a pre-determined position in the first direction.

2. The slide rail assembly of claim 1, wherein the second rail comprises a front section and a rear section; when the second rail is at the retracted position relative to the first rail, the plurality of rolling members of the second slide-aiding device supports at least a portion of the rear section of the second rail.

3. The slide rail assembly of claim 2, wherein the first rail comprises a first wall, a second wall and a longitudinal wall connected between the first wall and the second wall of the first rail, and the first wall, the second wall and the longitudinal wall of the first rail collectively define a passage that contains the second rail.

4. The slide rail assembly of claim 3, wherein the second rail comprises a first wall, a second wall and a longitudinal wall connected between the first wall and the second wall of the second rail, the second slide-aiding device comprises a first edge portion and a second edge portion, and the plurality of rolling members of the second slide-aiding device is arranged on the first edge portion and the second edge portion of the second slide-aiding device;
when the second rail is at the retracted position, the plurality of the rolling members of the second slide-aiding device supports the first wall and the second wall of the second rail.

5. The slide rail assembly of claim 4, wherein the first slide-aiding device comprises a first edge portion and a second edge portion, and the plurality of rolling members of the first slide-aiding device is arranged on the first edge portion and the second edge portion of the first slide-aiding device to support the first wall and the second wall of the second rail.

6. The slide rail assembly of claim 1, further comprising a first working member arranged on the first rail, and the second slide-aiding device comprises an engaging portion; when the second slide-aiding device is at the pre-determined position, the second slide-aiding device, via a blocking arrangement between the engaging portion and the first working member which is at a status, is prevented from displacing in a second direction opposite to the first direction.

7. The slide rail assembly of claim 6, wherein the first working member is movably disposed on the first rail, the slide rail assembly further comprises a third rail, the first rail is movably disposed between the third rail and the second rail, the third rail comprises a releasing structure; when the first rail displaces in a second direction relative to the third rail for a pre-determined returning range, the first working member is driven by the releasing structure to no longer be at the status, such that the second slide-aiding device is allowed to displace in the second direction from the pre-determined position.

8. The slide rail assembly of claim 7, further comprising a second working member arranged on the first rail; when the second rail at the retracted position displaces in the first direction relative to the first rail, the second rail, via the second working member, drives the first rail to synchronously displace with the second rail in the first direction relative to the third rail.

9. The slide rail assembly of claim 8, wherein the second working member is movably disposed on the first rail, and the slide rail assembly further comprises a second resilient member that provides an elastic force to the second working member.

10. The slide rail assembly of claim 6, further comprising a first resilient member that provides an elastic force to the first working member.

11. The slide rail assembly of claim 6, wherein the first rail further comprises a first limiting feature; when the second slide-aiding device is at the pre-determined position, the second slide-aiding device and the first limiting feature block each other such that the second slide-aiding device at the pre-determined position is prevented from displacing in the first direction.

12. A slide rail assembly, comprising:
a first rail;
a second rail displaceable relative to the first rail;
a first slide-aiding device and a second slide-aiding device, which are both arranged on the first rail, the second slide-aiding device comprising an engaging portion; and
a first working member movably disposed on the first rail and placed in one of a first status or a second status;
wherein, when the second rail is at a retracted position relative to the first rail, the first slide-aiding device and the second slide-aiding device support different sections of the second rail;
wherein, when the second rail displaces from the retracted position in a first direction for a pre-determined opening range, the second slide-aiding device follows the second rail and displaces to a pre-determined position in the first direction;
wherein, when the second slide-aiding device is at the pre-determined position, the second slide-aiding device, via a blocking arrangement between the engaging portion and the first working member which is at the second status, is prevented from displacing in a second direction opposite to the first direction.

13. The slide rail assembly of claim 12, further comprising a third rail and a second working member, the first rail being movably disposed between the third rail and the second rail, and the second working member being movably disposed on the first rail and placed in one of a first pre-determined status or a second pre-determined status; when the second rail at the retracted position displaces in the first direction relative to the first rail, the second rail, via the second working member which is at the first pre-determined status, drives the first rail to synchronously displace with the second rail in the first direction relative to the third rail.

14. The slide rail assembly of claim 13, wherein the third rail is further arranged with a positioning structure, and the positioning structure comprises a guiding feature, a blocking feature and a center feature arranged between the guiding feature and the blocking feature; when the second rail and the first rail continue to synchronously displace in the first direction relative to the third rail, the second working member is guided to the center feature by the guiding feature of the positioning structure, such that the second working member is supported by the center feature of the positioning structure and converts from the first pre-determined status to the second pre-determined status, allowing the second rail and the first rail to no longer synchronously displace in the first direction relative to the third rail.

15. The slide rail assembly of claim 14, wherein when the first rail displaces to an extended position in the first direction relative to the third rail, the second working member at the first pre-determined status engages the blocking feature of the positioning structure to prevent the first rail at the extended position from displacing in the second direction relative to the third rail.

16. The slide rail assembly of claim 15, wherein, when the second rail displaces from an open position for a range in the second direction relative to the first rail, the second rail pushes against the second working member such that the second working member converts from the first pre-determined status to the second pre-determined status, allowing the second working member to disengage from the blocking feature of the positioning structure, thereby letting the first rail at the extended position to displace in the second direction.

17. The slide rail assembly of claim 16, wherein the first working member comprises a driving feature; when the second rail continues to displace in the second direction, the second rail contacts the driving feature of the first working member which is at the second status, such that the second rail and the first rail synchronously displace in the second direction relative to the third rail, letting the second rail and an end of the first rail maintain a pre-determined spacing.

18. The slide rail assembly of claim 17, wherein the third rail is further arranged with a releasing structure; when the second rail and the first rail displace in a second direction relative to the third rail for a pre-determined returning range, the first working member is driven by the releasing structure to convert from the second status to the first status, allowing the second slide-aiding device to displace from the pre-determined position in the second direction.

19. The slide rail assembly of claim 13, further comprising a second resilient member that provides an elastic force to the second working member.

20. The slide rail assembly of claim 12, further comprising a first resilient member that provides an elastic force to the first working member.

* * * * *